United States Patent [19]

Shaheen

[11] 4,247,361
[45] Jan. 27, 1981

[54] METHOD OF ETCHING A SURFACE OF A BODY

[75] Inventor: Joseph M. Shaheen, La Habra, Calif.

[73] Assignee: Rockwell International Corporation, El Segundo, Calif.

[21] Appl. No.: 49,698

[22] Filed: Jun. 18, 1979

[51] Int. Cl.³ .................... B44C 1/22; C03C 15/00; C03C 25/06
[52] U.S. Cl. .................... 156/630; 156/252; 156/330; 156/633; 156/659.1; 156/663; 156/904; 252/79.3
[58] Field of Search ............ 428/415; 156/630, 633, 156/645, 654, 658, 659.1, 660, 661.1, 663, 904, 330, 331, 333, 252; 65/31; 252/79.3

[56] References Cited

U.S. PATENT DOCUMENTS

| 3,226,255 | 12/1965 | Cieniewicz et al. | 156/655 X |
| 3,433,888 | 3/1969 | Tally et al. | 428/415 X |
| 3,519,506 | 7/1970 | Topas | 156/661 X |
| 4,155,801 | 5/1979 | Provancher | 156/630 |

Primary Examiner—William A. Powell
Attorney, Agent, or Firm—H. Fredrick Hamann; Daniel R. McGlynn; Wilfred G. Caldwell

[57] ABSTRACT

A method of etching a surface of a body including the steps of applying a suitable modified epoxy thermo-setting adhesive coating to an etchant resisting masking film; punching the masking film in a predetermined pattern corresponding to the pattern to be etched on the body; applying the masking film to a major surface of the body to be etched, thereby exposing a portion of the major surface corresponding to the predetermined pattern; setting the adhesive coating by applying heat so that the masking film is securely attached to the body; and subsequently applying an etchant to the body covered by the making film so that the predetermined pattern is etched into the major surface of the body.

3 Claims, 2 Drawing Figures

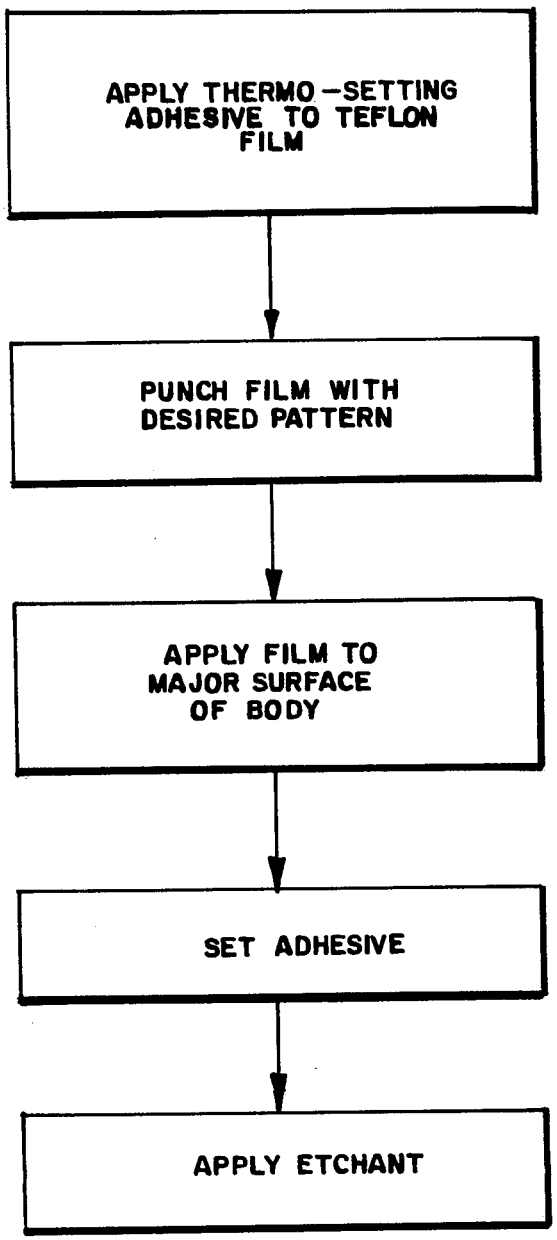
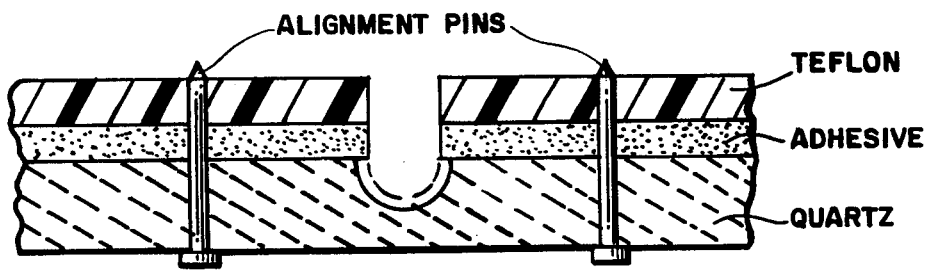
FIG. 1
FIG. 2

METHOD OF ETCHING A SURFACE OF A BODY

BACKGROUND OF THE INVENTION

The present invention relates to a method of manufacturing highly precise etched bodies, such as fused silica or quartz bodies used in guidance instruments. The presently used masking procedure for etching such quartz uses combinations of waxes and metal masks to provide the resist image. Such a prior art technique is similar to that found in U.S. Pat. No. 3,226,255 which is concerned with a masking method for semiconductors in which a wax film is applied to a surface covered with a metal mask which allows the wax to wicks corresponding to metal mask pattern.

Such a procedure is expensive and tedious and does not result in a highly accurate etched pattern on fused silica.

Other prior art methods of using a masking film with a pressure sensitive adhesive for etching bodies such as printed circuit cards are not suitable for the present application because such adhesives are not sufficiently chemically resistant, and would not result in the high quality lines and pattern definition required in the present application.

SUMMARY OF THE INVENTION

Briefly and in general terms, the invention concerns a method of etching a surface of a body by applying an adhesive coating to a masking film, punching a predetermined pattern in the masking film corresponding to the pattern to be etched on the body; adhesively applying the masking film to a surface of the body and thermally setting it, and subsequently etching the body so that the predetermined pattern is etched into the surface of the body.

BRIEF DESCRIPTION OF THE DRAWING

FIG. 1 is a schematic chart showing the various sequential steps in the present process; and FIG. 2 is a cross-sectional view of the quartz disk together with the masking film and adhesive film on a major surface thereof, with a portion of the surface of the disk being etched away.

DESCRIPTION OF THE PREFERRED EMBODIMENT

The present invention is concerned with etching a highly precise pattern on the surface of a quartz disk (fused silica) which is approximately 30 mils in thickness and 0.875 inch in diameter. The surface of the disk is highly polished and lapped optically flat. Such a fused quartz disk is used in guidance instruments as a proof mask. In such special purpose applications it is required that a highly accurate pattern of indentations be made in the major surface of the disk for use as a measuring surface, such as in an electromagnetic accelerometer.

As shown in FIG. 1, the method of etching the disk according to the present invention begins by first applying a modified epoxy thermo-setting adhesive to a Teflon film. The adhesive is chosen as being one which is resistant to the etchant liquid as well as having suitable physical properties in the intended application. In the present application the etchant liquid is 42% HF. The adhesive which is preferred with such an etchant is a nylon epoxy resin ECCO31 which is produced by the Fortin Laminating Corporation, 12840 Bradley Avenue, Silmar, CA.

Such a nylon epoxy resin is preferred as an adhesive because it is relatively flexible. A rigid epoxy resin would tend to crack when they are later punched to form the pattern. A cracked adhesive may result in imperfections or defects on the surface of the disk after the etching process.

A Teflon film is used as the actual masking element. The specific type of Teflon film is FEP, which is a copolymer of tetrafluoro-ethylene and hexafluoro-propylene. Such Teflon FEP is available commercially in thin sheets of one or two mil thickness from the Dupont Company, Wilmington, Del. The combination of the adhesive film and the Teflon film forms a non-porous composite which has properties of being "low-flow", and therefore is extremely useful in the present application where a highly accurate pattern definition is required. Other films such as copper foil, and trichloro-fluoro-ethylene (Kel F), can be used as well. Following the application of the adhesive epoxy to the Teflon film, the film is inserted into a punch and positioned. The film is punched to produce one or more perforations in the film at locations where the disk is desired to be etched, along with alignment holes.

The quartz disk is then placed and positioned in a holding device which has alignment pins so that the alignment holes in the disk are inserted into the corresponding alignment pins in the holding device.

The masking film is then applied to the major surface of the disk using the alignment holes and pins so that the pins in the holding device are inserted in the alignment holes in the film, as is known in the art. Heat is applied at a temperature of 275° F. for about 30 seconds at a pressure of 15 psi thereby ensuring an intimate contact of the masking film with the surface of the disk and subsequently cured in an oven at 350° F. for one hour to set the resin. Such thermo-setting of the masking film is necessary in the present invention in order to achieve resistance to the etching solutions.

After the masking film has been securely attached to the quartz surface, it is removed from the fixture and the disks are inserted in an etchant such as 42% HF, or a mixture of the HF and $H_3PO_4$, for a predetermined amount of time depending upon the desired depth of the etch. A cross-sectional view of the quartz disk, together with a perforated masking film and adhesive on a major surface of the disk, with the disk being etched away in the pattern of the perforation, is shown in FIG. 2. The disk is then removed from the etchant after the desired depth is attained, and rinsed in water.

While the invention has been illustrated and described as embodied in a method of etching a surface of a body, it is not intended to be limited to the details shown, since various modifications of the sequence of steps and changes in the masking film and/or adhesive may be made without departing in any way from the spirit of the present invention. For example, the adhesive may be applied to the masking film after the film has been punched.

Having thus described a preferred embodiment of the invention, what is claimed is:

1. A method of etching a surface of a body including the steps of:

applying a suitably flexible thermo-setting nylon epoxy resin adhesive coating to a relatively thin etchant resisting masking film composed of a copolymer of tetrafluoroethylene and hexafluoropropylene;

subsequently punching said masking film in a predetermined pattern corresponding to the pattern to be etched on the body;

applying said masking film to a major surface of the body to be etched, thereby exposing a portion of the major surface corresponding to the predetermined pattern;

setting said adhesive coating by applying heat so that said masking film is securely attached to said body; and subsequently applying an etchant to the body covered by said masking film so that said predetermined pattern is etched in said major surface of the body.

2. A method as defined in claim 1, wherein said etchant is a solution of HF.

3. A method as defined in claim 1, wherein said body is a quartz disk.

* * * * *